United States Patent
Michaud et al.

(10) Patent No.: US 10,244,069 B1
(45) Date of Patent: Mar. 26, 2019

(54) ACCELERATED DATA STORAGE SYNCHRONIZATION FOR NODE FAULT PROTECTION IN DISTRIBUTED STORAGE SYSTEM

(71) Applicant: EMC Corporation, Hopkinton, MA (US)

(72) Inventors: Adrian Michaud, Carlisle, MA (US); Randall Shain, Wrentham, MA (US); John S. Harwood, Paxton, MA (US); Kenneth J. Taylor, Franklin, MA (US); Stephen Wing-Kin Au, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 499 days.

(21) Appl. No.: 14/998,102

(22) Filed: Dec. 24, 2015

(51) Int. Cl.
*H04L 29/08* (2006.01)
*G06F 12/0813* (2016.01)
*G06F 12/0815* (2016.01)

(52) U.S. Cl.
CPC ...... *H04L 67/2842* (2013.01); *G06F 12/0813* (2013.01); *G06F 12/0815* (2013.01); *H04L 67/104* (2013.01); *H04L 67/1095* (2013.01); *G06F 2212/154* (2013.01); *G06F 2212/621* (2013.01)

(58) Field of Classification Search
CPC ............... H04L 67/2842; H04L 67/104; H04L 67/1095; G06F 12/0815; G06F 12/0813; G06F 2212/621; G06F 2212/154
See application file for complete search history.

(56) References Cited

U.S. PATENT DOCUMENTS

| | | | | |
|---|---|---|---|---|
| 7,636,814 B1 * | 12/2009 | Karr | .................... | G06F 12/0804 711/143 |
| 8,473,690 B1 * | 6/2013 | Condict | .............. | G06F 12/0815 711/141 |
| 8,930,364 B1 * | 1/2015 | Brooker | ............ | G06F 17/30017 707/736 |

(Continued)

OTHER PUBLICATIONS

EMC Corporation, "EMC ScaleIO," V1.32, User Guide, #302-001-033, Rev. 11, May 2015, 536 pages.

*Primary Examiner* — Clayton R Williams
*Assistant Examiner* — Tania M Pena-Santana
(74) *Attorney, Agent, or Firm* — Ryan, Mason & Lewis, LLP

(57) ABSTRACT

Systems, methods, and articles of manufacture comprising processor-readable storage media are provided for implementing an accelerated data storage synchronization to protect data in a storage system. For example, a first server node accesses a data block from a protected storage system in response to a request from an application executing on the first server node. A modified data block is written to a write-back cache of the first server node. A synchronization operation is performed in response to a request by the application, which includes sending a copy of the modified data block in the write-back cache to a second server node to temporarily store the copy of the modified data block in a storage media of the second server node, and informing the application that the synchronization operation is deemed complete after the copy of the modified data block is stored in the storage media of the second server node.

20 Claims, 5 Drawing Sheets

(56) References Cited

U.S. PATENT DOCUMENTS

| | | | |
|---|---|---|---|
| 2004/0117579 A1* | 6/2004 | Wu | G06F 11/2071 |
| | | | 711/170 |
| 2004/0153481 A1* | 8/2004 | Talluri, Sr. | G06F 3/0607 |
| 2006/0236033 A1* | 10/2006 | Guinn | G06F 12/0871 |
| | | | 711/118 |
| 2007/0189509 A1* | 8/2007 | Foody | H04L 67/2823 |
| | | | 380/2 |
| 2013/0339466 A1* | 12/2013 | Mayhew | H04L 49/103 |
| | | | 709/212 |

* cited by examiner

300

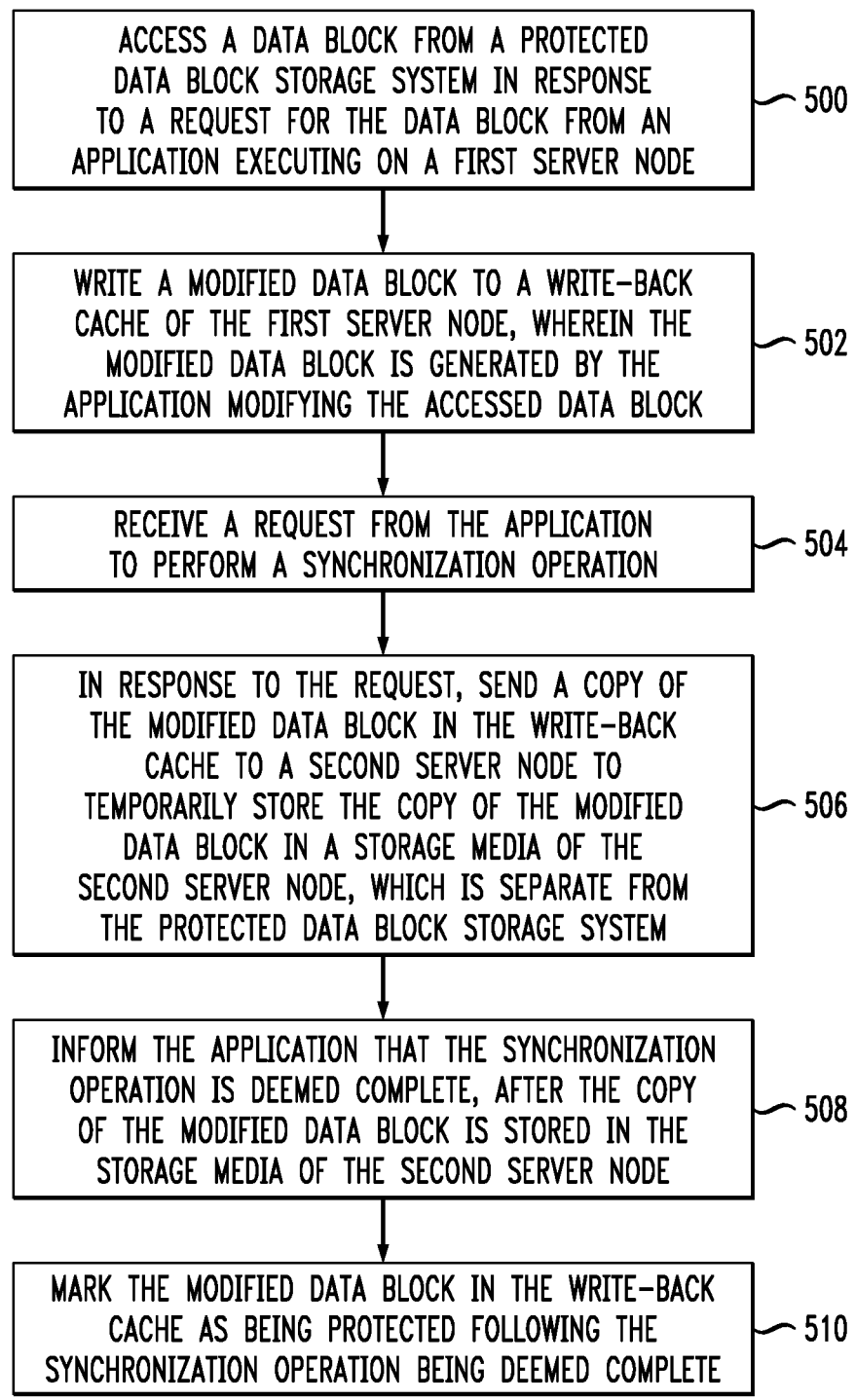

US 10,244,069 B1

ACCELERATED DATA STORAGE SYNCHRONIZATION FOR NODE FAULT PROTECTION IN DISTRIBUTED STORAGE SYSTEM

FIELD

The field relates generally to data storage systems, and in particular, to storage synchronization techniques for node fault protection in data storage systems.

BACKGROUND

A distributed or clustered data storage system typically comprises a network of servers in communication with multiple storage media nodes. An application program (e.g., a database application) running on one or more of the servers will require data associated with the application to be stored locally on the server, remotely on one or more of the storage media nodes, or stored both locally and remotely. A distributed or clustered data storage system comprising multiple storage nodes is typically architected with a data protection mechanism to provide protection from node failure by utilizing other nodes in the data storage system to, e.g., mirror stored data across multiple storage media nodes. In such protected data storage systems, it can be a challenge to improve storage write latency realized by an application without modifying the underlying data protection mechanism. Typically, the latency of write operations to the actual storage media nodes of the protected data storage system is much higher in comparison to the latency of the protection mechanism itself, which includes sending the writes over a network to potentially many other storage nodes. Therefore, in this circumstance, the latency of the protection mechanism would not be a bottleneck in the storage process.

Due to continuing innovations in storage media technologies, however, the operating speeds of storage devices are continually increasing, associated with lowering of latency. In this regard, it is difficult to realize the benefit of a lower storage latency provided by faster, state of the art storage media when the cluster storage protection mechanism that is implemented for a given data storage solution includes intrinsic overhead which, by itself, provides a latency floor that is much greater than the latency provided by much faster media. In this circumstance, when the storage media technology used to implement a protected data storage system has a very low latency as compared to the latency of the protection mechanism, then the protection mechanism becomes the bottleneck in the storage process. As such, the low latency afforded by the faster storage media cannot be realized, as every write must also experience the much higher latency of the protection mechanism.

SUMMARY

Illustrative embodiments include techniques for implementing an accelerated data storage synchronization process to protect stored data in a distributed data storage system. For example, one embodiment includes a method for managing memory, which is implemented by a first server node. The first server node accesses a data block from a protected data block storage system in response to a request for the data block from an application executing on the first server node. A modified data block is written to a write-back cache of the first server node, wherein the modified data block is generated by the application modifying the accessed data block. The first server node performs a synchronization operation in response to a synchronization request by the application. The synchronization operation includes sending a copy of the modified data block in the write-back cache to a second server node to temporarily store the copy of the modified data block in a storage media of the second server node, wherein the storage media is separate from the protected data block storage system. The first server node informs the application that the synchronization operation is deemed complete at least with respect to the modified data block in the write-back cache, after the copy of the modified data block is stored in the storage media of the second server node. A storage synchronization operation enables the seamless addition of low latency persistence of modified data blocks for an underlying protected data block storage system, while an I/O operation continues through the protected data block storage system path to store the modified blocks in the protected data block storage system.

Other embodiments of the invention include, without limitation, computing systems and articles of manufacture comprising processor-readable storage media.

BRIEF DESCRIPTION OF THE DRAWINGS

FIG. 5 is a flow diagram of an accelerated storage synchronization process according to an embodiment of the invention.

DETAILED DESCRIPTION

Embodiments of the invention will be described herein with reference to systems and methods for implementing an accelerated data storage synchronization process to protect stored data in a distributed data storage system. An accelerated storage synchronization process according to an embodiment of the invention can be added to an existing protected data storage system to seamlessly provide low latency persistence of modified data blocks while an I/O operation continues through the underlying protected data storage system path. Embodiments of the invention will be described with reference to illustrative computing systems, data storage systems, and associated servers, computers, memory devices, storage devices and other processing devices. It is to be appreciated, however, that embodiments of the invention are not limited to the particular illustrative system configurations as shown in the accompanying drawings.

It is to be understood that the term "computing system" as used herein with respect to various embodiments is intended to be broadly construed, so as to encompass, for example, private or public cloud computing systems, or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, an application that executes on a computing system to implement any type of block-level storage system, or combination of block-level storage systems, including, but not limited to storage area network (SAN) systems, direct attached storage (DAS) systems, Hadoop Distributed File System (HDFS), as well as other types of block-level storage systems comprising clustered or distributed virtual and/or physical infrastructure. The terms "application," "program," and "application program" as used herein refer to any type of software application, including desktop applications, server applications, database applications, and mobile applications. The terms "application process" and "process" refer to an instance of an application or program that is being executed within a computing environment.

Figure 1:
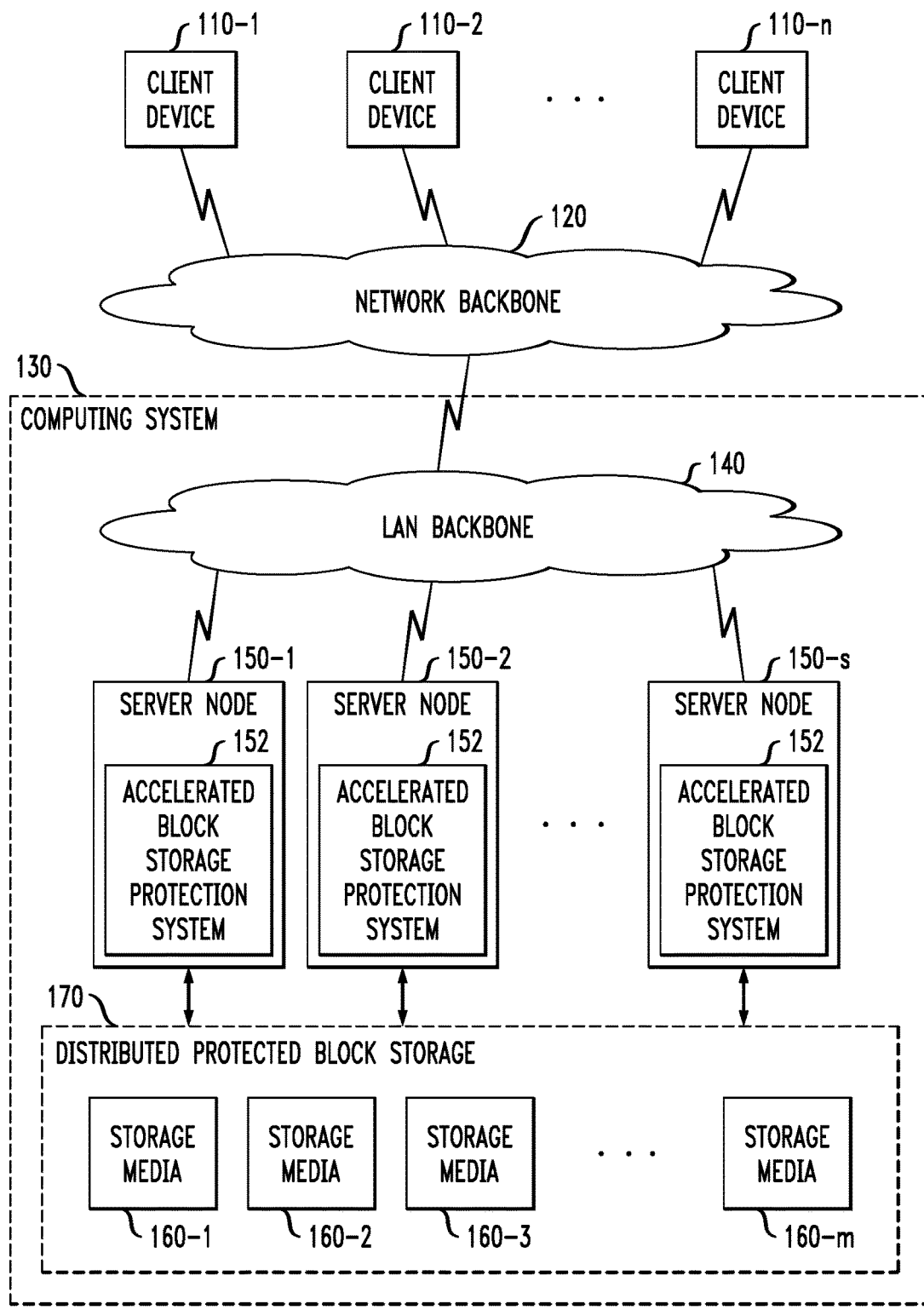
FIG. 1 is a high-level schematic illustration of a computing system which comprises an accelerated block storage protection system to protect a distributed block storage system against node failure, according to an embodiment of the invention.

FIG. 1 is a high-level schematic illustration of a computing system which comprises an accelerated block storage protection system to protect a distributed block storage system against node failure, according to an embodiment of the invention. In particular, FIG. 1 schematically illustrates a computing network 100 comprising a plurality of client devices 110-1, 110-2, ..., 110-n (collectively referred to as client devices 110), a network 120, and a computing system 130. The computing system 130 comprises a LAN (local area network) 140 (or CE (Converged Ethernet) network), a plurality of server nodes 150-1, 150-2, ..., 150-s (collectively referred to as servers 150), and a plurality of storage media devices 160-1, 160-2, ..., 160-m (collectively referred to as storage media devices 160), which implement a distributed block storage system 170.

The client devices 110 may comprise, for example, desktop computers, laptop computers, PDAs (personal digital assistants), smart phones, electronic tablets, or other types of computing devices that enable users and other entities to access the computing system 130 via the network 120. The network 120 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 120 in some embodiments therefore comprises combinations of multiple different types of communications networks each comprising network devices configured to communicate using Internet Protocol (IP) (e.g., TCP/IP) or other related communication protocols. The network 120 comprises intermediate points (such as routers, switches, etc.) and other elements that form a network backbone to establish communication paths and enable communication between network endpoints.

In one embodiment, the computing system 130 performs data processing and storage functions to support one or more network applications and/or on-line services that are associated with private or public entities. In one embodiment of the invention, the servers 150 are dedicated storage servers that are configured to control and manage access to the storage media devices 160 over the distributed block storage system 170. In another embodiment of the invention, the servers 150 are further configured as front-end application servers and/or web servers, which host and manage one or more applications that are utilized by multiple, simultaneously connected users and/or entities. Depending on the configuration of the computing system 130, the servers 150 are configured to, e.g., execute business logic, execute scripts and services to query databases, and perform other computing functions that are needed to host and deliver network applications and services to multiple end users, service providers, and/or organizations. In one embodiment of the invention, the cluster of servers 150 of the computing system 130 reside in a single facility (e.g., data center facility of a private company). In another embodiment, the cluster of servers 150 reside in two or more data center facilities or otherwise distributed over remote locations (e.g., distributed over a cloud network) of a given service provider, for example.

In one embodiment of the invention where the servers 150 comprise application servers, the LAN 140 comprises a plurality of network switches with Ethernet ports to implement a front-end customer facing network of the computing system 130, which enables client access to the servers 150. In addition, the LAN 140 comprises one or more switches (e.g., scale out switch fabric) that are configured to interconnect the server nodes 150 together with dedicated network links, thereby providing a switching fabric to enable peer-to-peer communication between the server nodes 150. In one embodiment, a Converged Ethernet (CE) network is implemented by running a user network and storage network on the LAN 140.

In one embodiment of the invention, the server nodes 150 are configured as a peer-to-peer server cluster, and the storage media 160 are configured for access by the server nodes 150 in the distributed block storage system 170. As is known in the art, a block-level storage system is a type of data storage where data is stored in volumes (also referred to as blocks). In a block-level storage, raw volumes of storage are created by the server nodes 150 and each block can be controlled as an individual hard drive, for example. The storage media devices 160 comprise persistent storage elements to store data, as well as control circuitry that is configured to control data access operations for storing or accessing data to and from one or more persistent storage elements that are associated with the storage media devices 160. The persistent storage elements can be implemented using one or more different types of persistent storage devices such as HDDs (hard disk drives), flash storage devices (e.g., PCIe flash cards), SSD (solid state drive) devices, or other types and combinations of non-volatile memory. The storage media devices 160 are configured as a networked-based storage to provide a centralized repository for data that can be stored and accessed by the servers 150. The storage media devices 160 collectively provide a pool of storage resources which can be utilized by the servers 150.

In one embodiment of the invention, the storage media devices 160 comprise off-infrastructure storage devices (e.g., external DAS (direct attached storage) devices) that are attached to associated server nodes 152 using suitable interfaces (e.g., SCSI, SATA or SAS interfaces), depending on the type of storage media. For example, each server node 150 may have one or more associated DAS devices directly attached thereto. The DAS devices can be configured to provide one or more separate storage pools, wherein each DAS device belongs to one storage pool, and wherein volumes can be logically generated across the DAS devices. In one embodiment, a logical volume is distributed over all storage media devices 160 that belong to the same storage pool, and each volume block comprises a least two copies located on at least two different storage media devices 160 (e.g., DAS devices) managed by different server nodes in the cluster of server nodes 150. In this embodiment, the DAS devices can be configured to provide a virtual SAN. In another embodiment, the storage media devices 160 can be configured in a storage area network (SAN) and coupled to the cluster of server nodes 150 via a dedicated switch fabric. The distributed block storage system 170 can be configured using other techniques known in the art to support a block-level data storage system.

As further shown in FIG. 1, the server nodes 150 implement an accelerated block storage protection system 152 that is configured to perform an accelerated storage synchronization process to protect data stored in the distributed block storage system 170 (e.g., provide node fault protection against failure of one or more of the server nodes 150) by mirroring data across the storage media devices 160 in the distributed (protected) block storage system 170. As explained in further detail below, in one embodiment of the invention, the accelerated block storage protection system 152 implements a storage synchronization protocol at the level of a write-back cache (or some other type of low latency, high performance localized storage media), wherein an acceleration mechanism is configured to protect dirty data blocks (i.e., modified data blocks) that are written by an application to a write-back cache that is resident on one of the server nodes 150 by temporarily storing copies of the dirty data blocks in remote storage media of at least one other server of the server nodes 150, which renders the storage synchronization "complete". The copies of the dirty data blocks are maintained in the remote storage media for enough time as needed to allow a slower backend storage synchronization operation to operate in an asynchronous manner to update the associated data blocks that are stored in two or more storage media devices 160 of the distributed block storage system 170, after the storage synchronization process is deemed complete.

In one embodiment, the computing system 130 can be implemented as a software-defined storage system such as ScaleIO™ which is commercially available from EMC Corporation of Hopkinton, Mass. For example, implementations utilizing ScaleIO™ can advantageously support hundreds or thousands of server nodes 150 with associated storage media devices 160, potentially providing one or more storage pools with a capacity on the order of a petabyte (PB). ScaleIO™ is a software-only solution that uses existing local storage media (e.g., HDD, SSD, or PCIe flash cards, either DAS or external) of a cluster of sever nodes and a LAN to create a virtual SAN that provides all the benefits of external shared block storage system. Such an arrangement overcomes scalability limitations inherent in certain conventional storage systems.

Furthermore, a failure protection functionality provided by ScaleIO™ can be used to protect against failures in one or more of the server nodes 150. When a volume is configured over a virtualization layer in a ScaleIO™ system, the volume is distributed over all devices residing in a same storage pool. Each volume block has two copies located on two different data server nodes. For example, ScaleIO™ maintains the user data in a RAID-1 mesh mirrored layout, wherein each piece of data is stored on two different server nodes. The copies are randomly distributed over the storage devices to protect against single point node failure. In one embodiment of the invention, the storage protection mechanisms provided by ScaleIO™ can be extended to include accelerated storage synchronization protocols as discussed herein. Additional details regarding ScaleIO™ functionality which can be incorporated into the computing system 130 can be found in, for example, EMC ScaleIO™ User Guide, V1.32, Document No. 302-001-033, Rev. 11, May 2015, which is incorporated by reference herein.

Figure 2:
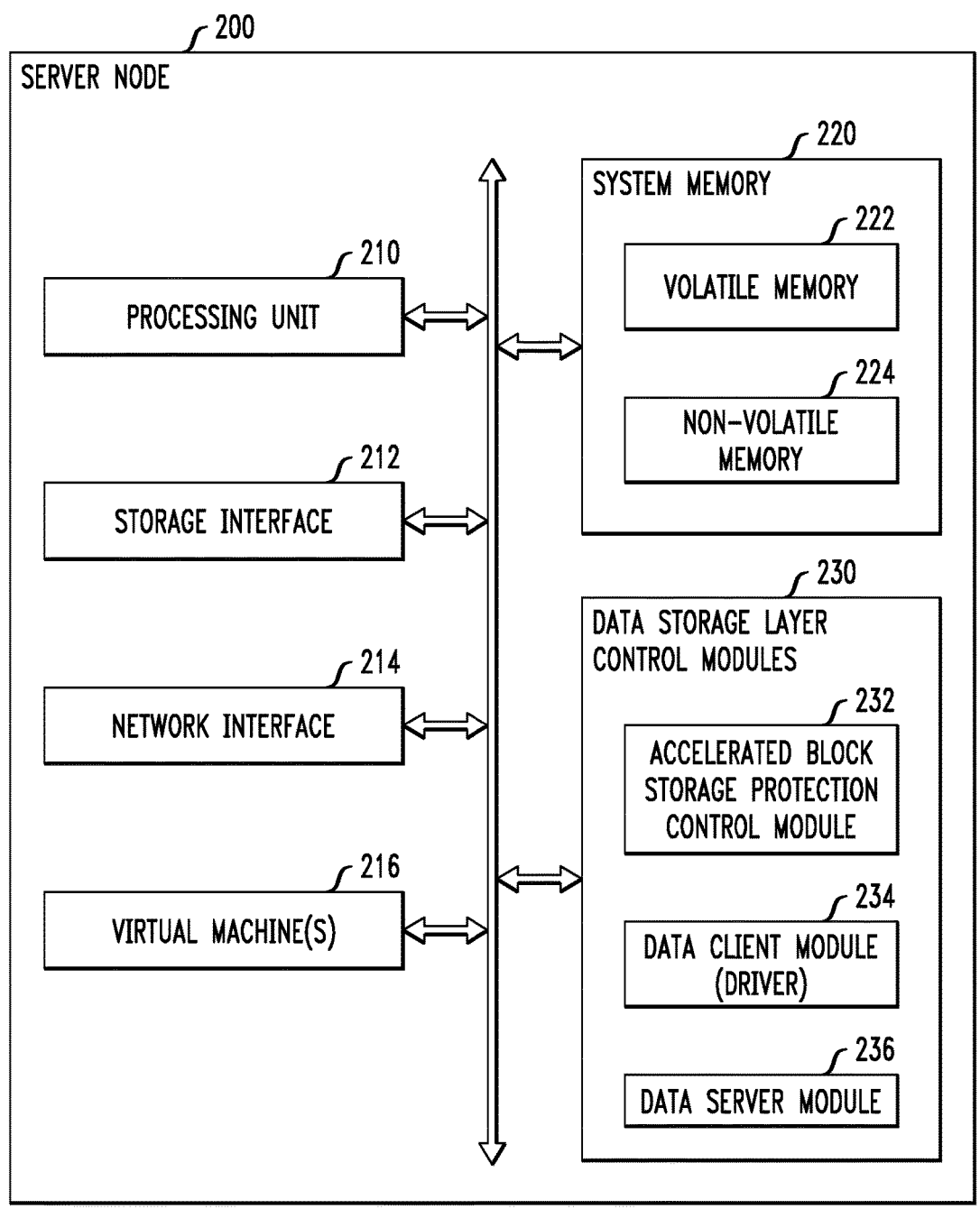
FIG. 2 schematically illustrates an embodiment of a server node that can be implemented in the computing system of FIG. 1, according to an embodiment of the invention.

FIG. 2 schematically illustrates an embodiment of a server node that can be implemented in the computing system of FIG. 1, according to an embodiment of the invention. In particular, FIG. 2 schematically illustrates a server node 200 comprising a processing unit 210, storage interface circuitry 212, network interface circuitry 214, one or more virtual machines 216, system memory 220, and data storage layer control modules 230. The system memory 220 comprises volatile memory 222 and one or more levels of non-volatile memory 224. The data storage layer control modules 230 provide functions for controlling access to storage media devices 160 in the distributed block storage system 170 and for implementing the accelerated block storage protection system 152. It is to be understood that in one embodiment of the invention, the data storage layer control modules 230 are implemented as software functions that are stored in the system memory 220 and executed by the processing unit 210. In other embodiments, the data storage layer control modules 230 may be implemented using a combination of dedicated hardware and firmware, in addition to software.

The processing unit 210 comprises one or more of different types of computer processors. The term "processor" as used herein is intended to be broadly construed so as to include any type of processor (or microprocessor, or microcontroller) that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators (e.g., protocol termination, cryptographic, compression, de-duplication, RAID, etc.). Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

The storage interface circuitry 212 enables the processing unit 210 to interface and communicate with the system memory 220, as well as enable the server node 200 to access the storage media devices 160 using one or more standard communication and/or storage control protocols to read, write and otherwise access data in persistent storage devices such as flash memory devices, DAS devices, SAN storage devices, etc., depending on the storage media devices 160 that are implemented. The network interface circuitry 214 enables the server node 200 to interface and communicate with a network and other system components. The network interface circuitry 214 may comprise conventional transceivers of a type well known in the art (e.g., network interface cards, I/O adaptors, etc.).

The virtual machines 216 may be utilized by the server node 200 to implement virtual functionalities for a given data storage solution. The virtual machines 216 are implemented using a hypervisor. As is known in the art, virtual machines are logical processing elements that may be instantiated on one or more physical processing elements (e.g., servers, computers, or other processing devices). That is, a "virtual machine" generally refers, to a software implementation of a machine (i.e., a computer) that executes programs in a manner similar to that of a physical machine. Thus, different virtual machines can run different operating systems and multiple applications on the same physical computer. A hypervisor is one element of what is more generally referred to as "virtualization infrastructure." The hypervisor runs on physical infrastructure, e.g., CPUs and/or storage devices. An example of a commercially available server virtualization platform that may be used to implement portions of the computing system 130 in one or more embodiments of the invention is the VMware® vSphere™ which may have an associated virtual infrastructure management system such as the VMware® vCenter™. The underlying physical infrastructure may include one or more distributed processing platforms that include storage products such as VNX® and Symmetrix VMAX®, both commercially available from EMC Corporation (Hopkinton, Mass.).

In one embodiment, the system memory 220 of the server node 200 may be configured in a hierarchical memory tier structure wherein the volatile memory 222 (highest level in a memory tier) may comprise a dynamic random-access memory tier (e.g., DRAM) or other forms of volatile random-access memory. The non-volatile memory 224 (lower level in the memory tier) may comprise a storage-class memory (SCM) tier that is accessible as a memory resource. For example, the non-volatile system memory 224 may comprise one or more SCM devices including, for example, NAND flash and next generation non-volatile memory (NG-NVM) devices. The system memory 220 is configured to store program instructions that are read and processed by the processing unit 210 to run a native operating system (OS), as well as program instructions associated with the virtual machines 216 and data storage layer control modules 230 to run instances of one or more virtual machines and a data storage layer on the server node 200. The system memory 220 and other persistent storage elements described herein having program code tangibly embodied thereon are examples of what is more generally referred to herein as "processor-readable storage media" that store executable program code of one or more software programs. Other examples of processor-readable storage media embodying program code include, for example, optical or magnetic storage disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

As noted above, the data storage layer control modules 230 comprises various modules (e.g., software modules) that can be utilized to run an instance of a data storage layer on a server node to control access to storage media devices 160 in the distributed block storage system 170 and to implement functionality of the accelerated block storage protection system 152. In one embodiment as shown in FIG. 2, the data storage layer control modules 230 comprise an accelerated block storage protection control module 232, a data client module 234 and a data server module 236. The accelerated block storage protection control module 232 implements functions to control a storage synchronization protocol which leverages a write-back cache (or some other type of low latency, high performance localized storage media) on one server node, and remote storage media on another server node, to accelerate (decrease latency) a storage synchronization function while maintaining node fault protection. The data client module 234 comprises functions to implement a lightweight device driver that exposes volumes as block devices to an application that resides on the server node 200. The data server module 236 comprises functions to manage the capacity of the server node 200 and acts as a back-end for data access. The data server module 236 is installed on all server nodes that contribute storage media devices 160 to the distributed blocks storage system 170. The storage media devices 160 are accessed through the data server module 236.

Figure 3:
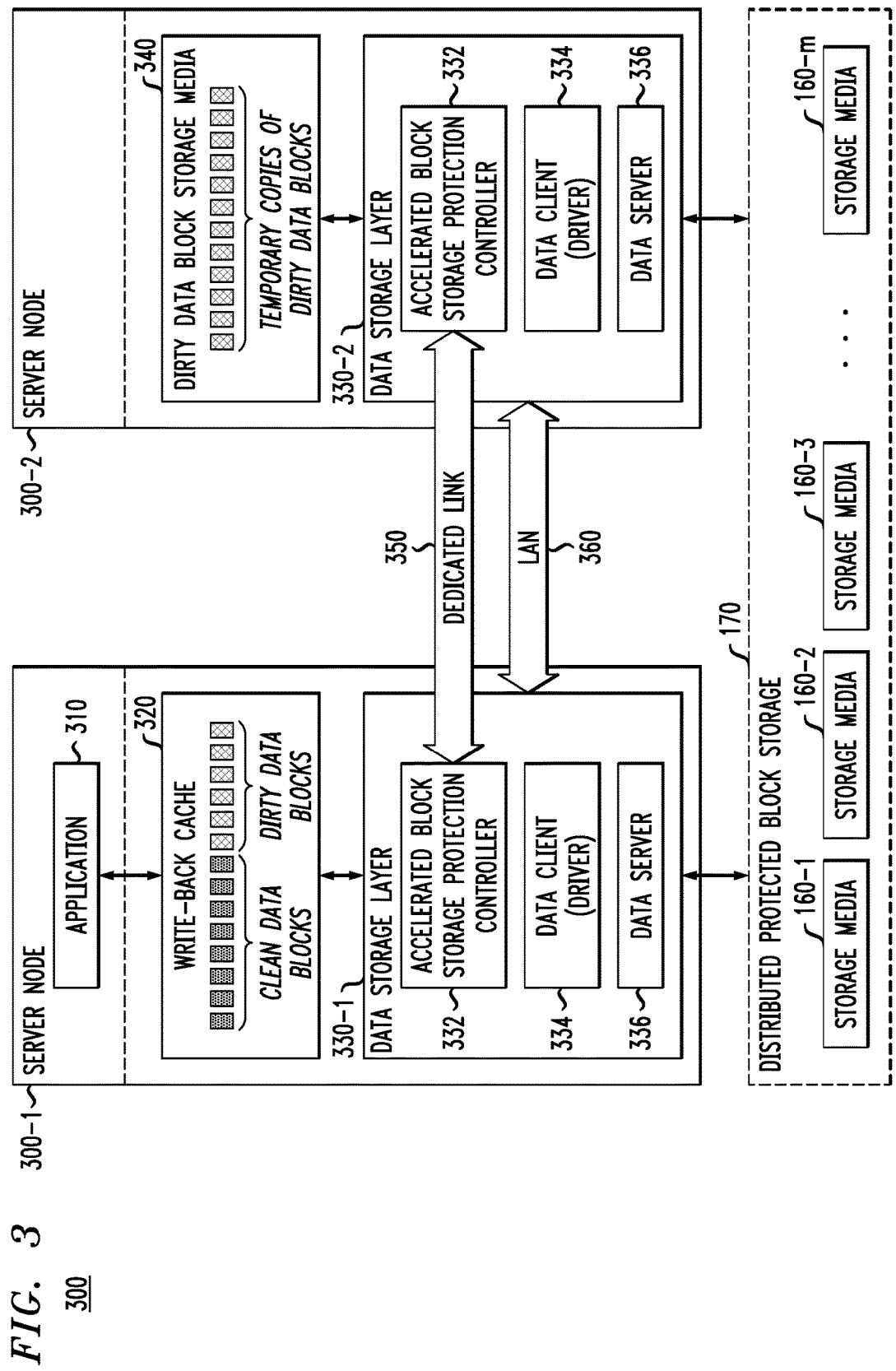
FIG. 3 schematically illustrates a method for configuring server nodes in the computing system of FIG. 1 to implement an accelerated storage synchronization process, according to an embodiment of the invention.

FIG. 3 schematically illustrates a method for configuring server nodes in the computing system 130 of FIG. 1 to implement an accelerated storage synchronization process, according to an embodiment of the invention. More specifically, FIG. 3 schematically illustrates a server node configuration 300 of a first server node 300-1 and a second server node 300-2 to implement an accelerated storage synchronization process to protect the distributed block storage system 170 against node failure, according to an embodiment of the invention. As shown in FIG. 3, the first server node 300-1 hosts an application 310 which executes on the first server node 300-1. The first server node 300-1 comprises a write-back cache 320 and a data storage layer 330-1. The second server node 300-2 comprises a data storage layer 330-2 and a dirty data block storage media 340.

In one embodiment of the invention, the write-back cache 320 comprises a cache memory that is implemented using low-latency system memory (e.g., volatile or non-volatile system memory) of the first server node 300-1. As is known in the art, when a cache is configured as a write-back cache, data modifications (e.g., write operations) to data stored in the write-back cache may not be copied to backend storage until a synchronization process is initiated. A write-back cache enables low latency and high throughput for write-intensive applications.

Further, in one embodiment of the invention, the dirty data block storage media 340 is implemented using low-latency volatile or non-volatile memory, which resides on the second server node 300-2, and which is separate from the storage media 160 of the distributed (protected) block storage system 170. For example, the dirty data block storage media 340 can be implemented using volatile or non-volatile system memory that resides on the second server node 300-2. As explained below, the dirty data block storage media 340 is configured to temporarily store copies of dirty data blocks (i.e., modified data blocks) that are present in the write-back cache 320 during an accelerated storage synchronization process.

The data storage layer 330-1 of the first server node 300-1 comprises an accelerated block storage protection controller 332, a data client 334, and a data server 336. Similarly, the data storage layer 330-2 of the second server node 300-2 comprises an accelerated block storage protection controller 332, a data client 334, and a data server 336. In one embodiment of the invention, the data storage layers 330-1 and 330-2 each comprise instances of the data storage layer control modules 230 discussed above with reference to FIG. 2. The data clients 334 and data severs 336 of the data storage layers 330-1 and 330-2 implement functions as discussed above to access and manage data from storage media devices 160 of the distributed block storage system 170. Furthermore, in the embodiment of FIG. 3, the accelerated block storage protection controllers 332, which control accelerated storage synchronization functions as discussed herein, are natively incorporated within the data storage layers 330-1 and 330-2 of the first and second server nodes 300-1 and 300-2. Depending on the storage system configuration and the level of accelerated data storage protection that is desired for a given storage solution, one or more server nodes in a given server cluster can be configured to implement a low latency dirty data block storage media to facilitate accelerated storage synchronization functions as discussed herein.

The accelerated block storage protection controllers 332 provide block storage protection using an accelerated storage synchronization protocol at the level of the write-back cache 320. The acceleration mechanism is configured to protect dirty data blocks (i.e., modified data blocks) that are written by the application 310 to the write-back cache 320 on the first sever node 300-1 by temporarily storing copies of the dirty data blocks in the remote storage media 340 on the second server node 300-2, which renders the storage synchronization "complete". In one embodiment of the invention, the accelerated block storage protection controllers 332 communicate over a dedicated link 350 to transmit and store copies of the dirty data blocks from the write-back cache 320 to the remote dirty data block storage media 340. The copies of the dirty data blocks are maintained in the remote storage media 340 for enough time as needed to allow a slower backend storage synchronization operation, initiated by the other components of the data storage layer 330-1, to operate in an asynchronous manner to update the associated data blocks that are stored in two or more storage media devices 160 of the distributed block storage system 170, after the storage synchronization process is deemed complete. A LAN network 360 enables peer-to-peer communication between the data storage layers 330-1 and 330-2 of the sever nodes 300-1 and 300-2 to perform backend storage synchronization operations.

In the embodiment shown in FIG. 3, the dedicated link 350 can be implemented using any suitable high-speed communication protocol, independent of the existing cluster interconnect (e.g., LAN 360). In another embodiment of the invention, if an independent dedicated link 350 is not available, the existing cluster interconnect (e.g., LAN 360) can be utilized to send dirty data block writes to the second server node 300-2 since the round trip latency of the dirty block writes to implement the accelerated storage synchronization operation would still be much lower than the latency of writing dirty data blocks directly to the distributed protected block storage system 170 as in a conventional storage synchronization operation.

Figure 4:
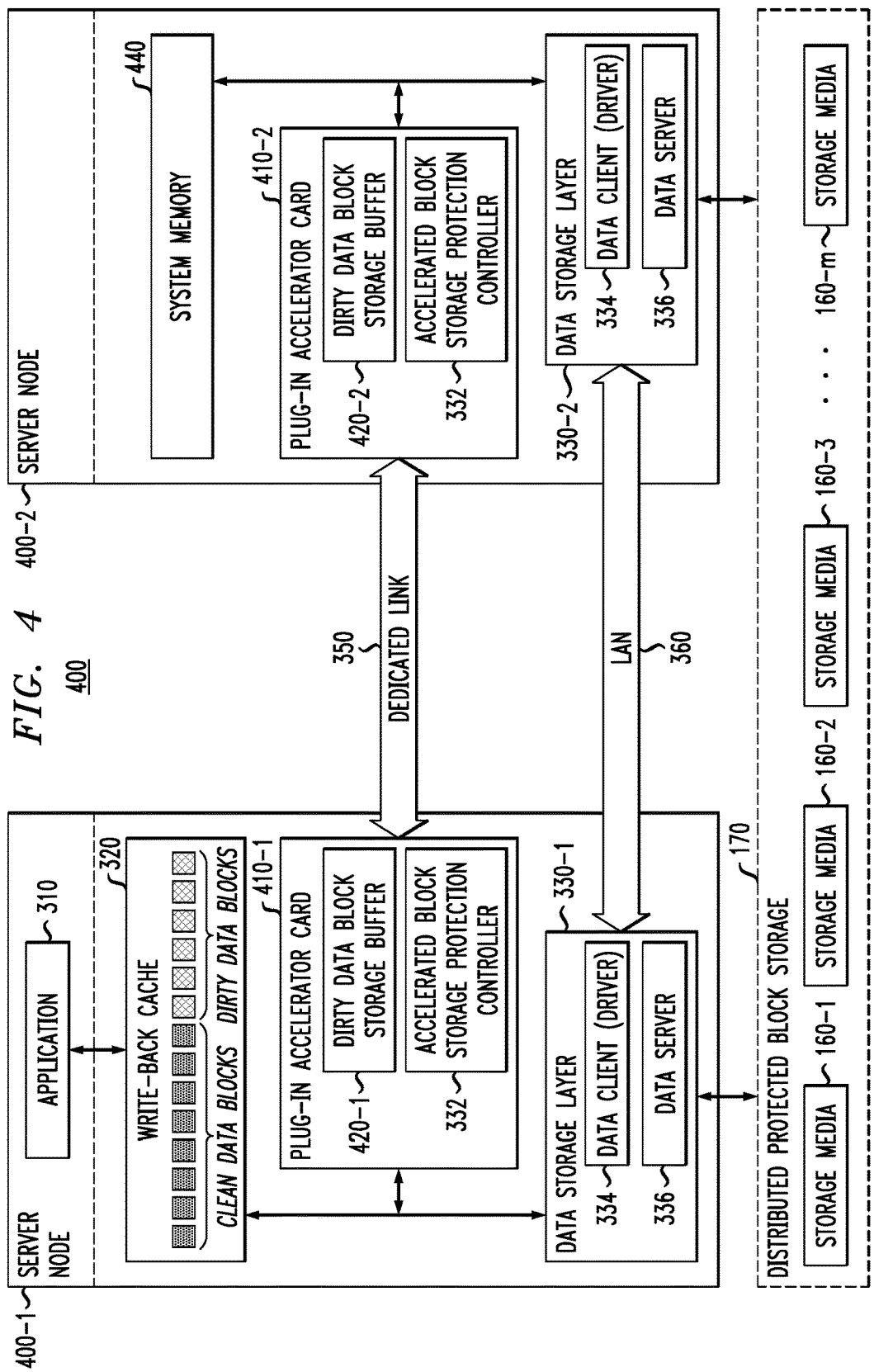
FIG. 4 schematically illustrates a method for configuring server nodes in the computing system of FIG. 1 to implement an accelerated storage synchronization process, according to another embodiment of the invention.

FIG. 4 schematically illustrates a method for configuring server nodes in the computing system of FIG. 1 to implement an accelerated storage synchronization process, according to another embodiment of the invention. More specifically, FIG. 4 schematically illustrates a server node configuration 400 of a first server node 400-1 and a second server node 400-2 to implement an accelerated storage synchronization process to protect the distributed block storage system 170 against node failure, according to another embodiment of the invention. The server configuration 400 in FIG. 4 is similar to the server configuration 300 in FIG. 3 except that the first and second server nodes 400-1 and 400-2 comprise respective plug-in accelerator cards 410-1 and 410-2, which are configured to control accelerated storage synchronization functions as discussed herein. With this embodiment, the peer dirty data block writes and network transfers are offloaded to the accelerator cards 410-1 and 410-2 so that the storage synchronization acceleration functionality has minimal effect on the cluster node resources.

In particular, as shown in FIG. 4, the functionality of the accelerated block storage protection controller 332 is incorporated in each of the plug-in accelerator cards 410-1 and 410-2, as opposed to being natively implemented as part of the data storage layers 330-1 and 330-2 (as in FIG. 3). In addition, the plug-in accelerator cards 410-1 and 410-2 comprise respective dirty data block storage buffers 420-1 and 420-2. The dirty data block storage buffer 420-1 is configured to store copies of dirty data blocks that reside in the write-back cache 320, which are to be transmitted to the second server node 400-2 under control of the accelerated block storage protection controllers 332 of the accelerator cards 410-1 and 410-2. In one embodiment of the invention, the dirty data block storage buffer 420-2 of the plug-in accelerator card 410-2 on the second server node 400-2 is configured to implement the functionality of the dirty data block storage media 340 of FIG. 3, and temporarily store copies of the dirty data blocks in the write-back cache 320, which are received from the first server node 400-1. The second server node 400-2 comprises system memory 440, which in an alternate embodiment, can be used to temporarily store copies of the dirty data blocks that are transferred from the dirty data block storage buffer 420-2 of the plug-in accelerator card 410-2 of the second server node 400-2 under control of the accelerated block storage protection controller 332.

Exemplary operating modes of the server configurations shown in FIGS. 3 and 4 will now be explained in further detail with reference to FIG. 5. In particular, FIG. 5 is a flow diagram of an accelerated storage synchronization process according to an embodiment of the invention. While an application (e.g., application 310) is executing on a first server node (e.g., server nodes 300-1 or 400-1), the first server node will access a data block from a protected data block storage system (e.g., distributed block storage system 170) in response to a request for the data block from the application executing on the first server node (block 500). For example, in the embodiments of FIGS. 3 and 4, the data storage layer 330-1 will access data blocks as requested by the application 310 from distributed block storage system 170, and store the accessed data blocks in the write-back cache 320 as unmodified (clean) data blocks. In one embodiment of the invention, the distributed protected block storage system 170 could be accessed as a block device directly by the application 310. In another embodiment, the distributed protected block storage system 170 could be accessed by the application 310 by means of a memory mapping technique, as is known in the art. In either case, dirty data blocks are buffered in the write-back cache 320 until the application 310 performs a storage synchronization operation that is applicable to the application's chosen method of access.

The application 310 can access a clean data block from the write-back cache 320 and then modify the data block. The first server node will then write the modified (dirty) data block to the write-back cache 320 (block 502). At some point during execution of the application, the write-back cache 320 will include multiple modified (dirty) data blocks which need to be mirrored to other server nodes to provide protection against possible server node failure. The first server node will receive a request from the application 310 to perform a storage synchronization operation to protect the dirty data in the write-back cache 320 (block 504).

In response to the request for storage synchronization, the first sever node will send copies of the modified data block(s) in the write-back cache to a second server node to temporarily store the copies of the modified data block(s) in a storage media of the second server node, wherein the storage media is separate from the protected data block storage system (block 506). For example, in one embodiment of the invention as shown in FIG. 3, the accelerated block storage protection controller 332 (which executes in the data storage layer 330-1 of the first server node 300-1) sends copies of the dirty data blocks in the write-back cache 320 to the second server node 300-2 over the dedicated link 350, wherein the copies of the dirty data blocks are temporarily stored in the dirty data block storage media 340. On the second server node 300-2, the accelerated block storage protection controller 332 executing in the data storage layer 330-2 of the second server node 300-2, implements functionality to store the received copies of the dirty data blocks in the dirty data block storage media 340.

In an alternate embodiment of the invention as shown in FIG. 4, in response to a storage synchronization request, copies of the dirty data blocks in the write-back cache 320 are written to the data block storage buffer 420-1 of the plug-in accelerator card 410-1 of the first server node 400-1. The accelerated block storage protection controller 332 which executes on the plug-in accelerator card 410-1 sends the copies of the dirty data blocks (in the dirty data block storage buffer 420-1) to the plug-in accelerator card 410-2 of the second server node 400-2 over the dedicated link 350, wherein the copies of the dirty data blocks are temporarily stored in the dirty data block storage buffer 420-2 of the plug-in accelerator card 410-2. On the second server node 400-2, the accelerated block storage protection controller 332 executing on the plug-in accelerator card 410-2 implements functionality to store the received copies of the dirty data blocks in the dirty data block storage buffer 420-2.

Referring again to FIG. 5, after the copies of the modified data blocks in the write-back cache 320 are stored in the dedicated storage media on the second server node, the application 310 is informed that the synchronization operation is deemed "complete" at least with respect to the copies of the dirty data blocks in the write-back cache 320 which have been written to the remote dedicated storage media of the second server node (block 508). Thereafter, for those dirty data blocks which have been mirrored to the remote storage media (e.g., storage media 340, FIG. 3 or storage buffer 420-2, FIG. 4), the first server node will mark the modified (dirty) data blocks in the write-back cache 320 as being "protected" following the synchronization operation being deemed complete (block 510). The indication of "protected" or "dirty protected" differs from an indication of "dirty" (modified), in that "protected" signifies that the dirty data block has been replicated somewhere off-node, but has not yet been reconciled with the underlying distributed protected block storage system 170.

In this regard, in accordance with embodiments of the invention, a storage synchronization process with regard to dirty data blocks in the write-back cache 320 is essentially terminated when copies of those dirty data blocks are successfully stored in the remote storage media on a peer server node. In this instance, when the storage synchronization returns complete to the application 310, the application can expect that the dirty data blocks in the write-back cache 320 are protected, even if the dirty data blocks in the write-back cache 320 have not yet been written back to the distributed protected block storage system 170. Indeed, this is because of the fact that if there is a failure of the server node on which the write-back cache 320 resides, copies of the protected dirty data blocks can be recovered from the remote storage media on the peer server node in which the protected dirty data blocks are stored.

In any event, following completion of an accelerated storage synchronization process (e.g., FIG. 5), the protected dirty data blocks in the write-back cache can be written asynchronously to the distributed protected block storage system 170 using a standard mirroring protocol as implemented by the storage servers to further protect against node failure. For example, in the embodiment shown in FIG. 3, the data storage layer 330-1 of the first server node 300-1 can determine the location where a given protected dirty data block in the write-back cache 320 is stored in the distributed protected block storage system 170, and cause the given protected dirty data block to be written to the appropriate storage media device 160. The storage media device 160 (e.g., DAS device) may be one that is locally coupled to the first server node 300-1 in which case the data storage layer 330-1 will proceed to store the protected dirty data block to the local storage media device 160. The data storage layer 330-1 will then proceed to send a copy of the protected dirty data block to a remote server node over the server node communication network (e.g., LAN 360) to store a replicate of the protected dirty data block in a remote storage media device 160 associated with that remote server node. Alternatively, the data storage layer 330-1 may determine that the protected dirty data block is stored in a storage media device 160 associated with a remote server node, and then send a copy of the protected dirty data block to that remote server node over the server node communication network (e.g., LAN 360) for storage in the local storage media device of that remote server node. Moreover, the remote server node will then, in turn, determine the location where a replica of the protected dirty data block is to be stored in the distributed protected block storage system 170 and then send a copy of the protected dirty data block to the associated server node.

Once all the protected dirty data blocks are successfully written to and protected in the distributed block storage system 170, the first server node 300-1 will mark the protected dirty data blocks in the write-back cache 320 as "clean" (i.e. unmodified). Thereafter, the corresponding copies of the dirty data blocks residing in the dirty data block storage media 340 on the second server node 300-2 can be invalidated to free up space for subsequent temporary storage of dirty data blocks. Various techniques can be implemented for invalidating copies of dirty data blocks that are stored in the remote storage media (e.g. media storage 340 (FIG. 3) or buffer storage 420-2 (FIG. 4)). Such techniques are designed to minimize remote storage synchronization communication traffic.

In particular, an originating server node performing an accelerated storage synchronization process (e.g., a server node sending copies of dirty data blocks to a remote server node for storage in a remote dirty data block storage media) should know how much dirty data block storage capacity is available on the remote server node at any given time based on how much dirty data has been sent by the originating server node and how much data is marked "dirty protected" in the write-back cache of the originating server node. Once "dirty" or "dirty protected" cache blocks are marked clean, the originating server node can record locally that the remotely stored copies of the dirty data blocks are invalid and, thus, can be deleted, overwritten, or otherwise invalidated to make room in the remote dirty data block storage media to store new dirty blocks. This can be handled in several ways.

For example, in one embodiment of the invention, the remote dirty data block storage media (e.g. media storage 340 (FIG. 3) or buffer storage 420-2 (FIG. 4)) can be directly exposed on the originating server node using an RDMA protocol. The use of an RDMA protocol would allow the originating server node to control and manage the remote dirty data block storage media as if it were a local storage media. In another embodiment of the invention, the accelerated block storage protection controller 332 on the remote server node can have functionality to handle invalidation requests from the originating server node that come marshaled with incoming dirty data block writes (i.e. no separate message round-trip required). In other words, dirty data block write requests, which are sent from the originating node to the remote server node, can include a message that is marshaled with the write requests to inform the remote server node which of the former dirty data blocks can be treated as invalid and thus overwritten. This would save a round-trip message for the invalidation.

As discussed above, an accelerated storage synchronization process according to an embodiment of the invention utilizes a separate low latency storage media on a remote peer server node in the server cluster to accelerate local data storage synchronization operations for dirty data blocks that are destined for storage in the distributed protected block storage system. The separate low latency storage media on the peer server node is used to temporarily store copies of dirty data blocks from the originating server node. Provided that the time required to copy the dirty data blocks to the separate low latency storage media on the remote peer server node is less than the time required to complete the write of those dirty data blocks to the distributed block storage system, an accelerated storage synchronization process is realized. The accelerated storage synchronization process essentially enables accelerated node fault protection temporarily at the write-back cache level.

Moreover, an accelerated storage synchronization process according to an embodiment of the invention serves to protect dirty data blocks on a cache synchronization operation only long enough to allow the much slower back end storage to work in an asynchronous fashion after the sync has been completed to the application. This allows for a much smaller storage footprint to be required as the accelerating cache store on a remote node. Since the copies of the dirty data blocks only need to be temporarily stored in the separate low latency storage media on the remote peer server node until such dirty data blocks have been successfully written to the backend distributed block storage system, the capacity of the separate low latency storage media on the remote server node can be limited to handle a more manageable amount of dirty data. In fact, as long as the originating server node knows the peer storage capacity, it can intelligently manage the dirty data traffic.

In one embodiment, of the invention, in the event that a remote sever node does not have the capacity to handle all the outstanding dirty blocks on a given storage synchronization operation, or a Quality of Service (QoS) knob sets a limit on dirty blocks (e.g., by capacity or region) to accelerate in this manner, the acceleration mechanism on the originating node can choose to send only a portion of the dirty blocks to the peer node temporarily and send the rest down to the distributed protected block storage system synchronously as a way to get some acceleration benefit. More specifically, in one embodiment of the invention, the originating server node can be configured to implement a "split write" storage synchronization operation. With a "split write" storage synchronization operation, the originating server node can be configured to send a portion of all dirty data blocks present in the write-back cache to the separate low latency storage media on the remote peer server node, and send a remaining portion of the dirty data blocks present in the write-back cache for storage in the distributed protected block storage system.

The "split write" storage synchronization process can be implemented in instances where there is limited storage capacity (at the time of the synchronization process) in the separate low latency storage media on the remote peer server node, where all of the dirty data cannot be written to the remote storage media. In this regard, based on the storage load of the low latency storage media on the remote server node and based on the latency of sending a portion of the dirty data blocks to the backend distributed block storage system in parallel, the originating server node can fine tune the benefit of the accelerated storage synchronization. When a "split write" storage synchronization operation is employed, the remote write completions will result in the dirty data blocks in the write-back cache being marked as "dirty protected" while the cluster storage write completions will result in the associated cache blocks being marked as "clean".

In another embodiment of the invention, when an originating server node performs a synchronization operation, the originating server node can determine if there is sufficient or insufficient storage capacity on the low latency storage media of the remote server node to store copies of all of the dirty data blocks in the write-back cache of the originating server node. If it is determined that there is insufficient storage capacity on the low latency storage media of the remote server node to store copies of all of the dirty data blocks in the write-back cache of the originating server node, the originating server node can proceed to cause copies of only a subset of the dirty data blocks in the write-back cache to be sent to the remote server node synchronously with storing all copies of the dirty data blocks (present in the write-back cache) in corresponding locations in the underlying protected data block storage system.

In another embodiment of the invention, an accelerated storage synchronization process can be optimized in instance where, if by chance, any of the asynchronous writes to the underlying distributed block storage system 170 complete before the associated cache entries have been marked "dirty protected", the dirty data blocks in the write-back cache can just be marked "clean" and, for whatever reason the remote writes of the dirty data blocks happened to be slower, the realized latency should never be worse than if the acceleration mechanism was not employed. In other words, in the event that an asynchronous write to the distributed protected block storage completes unexpectedly before the associated peer write, the associated cache block can be marked clean and the unexpected delay for the peer write should have no negative effect on the overall storage synchronization latency.

It is to be understood that accelerated storage synchronization techniques as discussed herein can be modified to operate in storage solutions that allow concurrent access to storage media devices in the distributed protected bock storage system from multiple server nodes in the server cluster. In many cases, these clusters are configured to allow one node to access the storage device at a time but provide fail-over or load balancing operations to move an application, and thus its point of access, to a different node. An accelerated storage synchronization mechanism according to embodiments of the invention will still work in such cases if the accelerated storage synchronization mechanism is integrated into the access movement mechanism to allow it to complete all outstanding dirty block writes to the shared cluster storage prior to the access point move.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for managing memory, comprising:
   accessing, by a first server node, a data block from a protected data block storage system in response to a request for the data block from an application executing on the first server node;
   writing, by the first server node, a modified data block to a write-back cache that is implemented in system memory residing on the first server node, wherein the modified data block comprises a modified version of the accessed data block which is generated by the application modifying the accessed data block;
   protecting the modified data block for write-back to the protected data block storage system by the first server node performing a storage synchronization operation in response to a storage synchronization request by the application, wherein the storage synchronization operation comprises:
      the first server node sending a copy of the modified data block in the write-back cache to a second server node to temporarily store the copy of the modified data block in storage media locally residing on the second server node, wherein said storage media is separate from the protected data block storage system;
      the first server node informing the application that the storage synchronization operation is deemed complete at least with respect to the modified data block in the write-back cache, in response to the copy of the modified data block being stored in said storage media locally residing on the second server node; and
      the first server node marking the modified data block in the write-back cache as being protected, in response to the synchronization operation being deemed complete; and
   initiating, by the first server node, an asynchronous write-back operation to store a copy of the modified data block in the write-back cache, which is marked as being protected, in the protected data block storage system.

2. The method of claim 1, wherein the copy of the modified data block is sent from the first server node to the second server node over a dedicated communication link between the first and second server nodes, which is separate from a communications network used by the first and second server nodes for peer-to-peer communication.

3. The method of claim 1, further comprising:
   marking, by the first server node, the modified data block in the write back cache as unmodified, after the copy of the modified data block is stored in the protected data block storage system; and
   causing, by the first server node, the copy of the modified data block in said storage media locally residing on the second server node to be invalidated.

4. The method of claim 1, wherein the asynchronous write-back operation comprises:
   determining at least two locations in the protected data storage system which correspond to the modified data block; and
   causing the copy of the modified data block in the write-back cache to be stored in the at least two locations in the protected data storage system.

5. The method of claim 1, wherein performing the storage synchronization operation by the first server node further comprises:
   utilizing, by the first server node, a remote direct memory access protocol for remotely controlling the storage media locally residing on the second server node;
   wherein remotely controlling the storage media comprises:
      writing the copy of the modified data block in the storage media locally residing on the second server node; and
      invalidating copies of one or more other modified data blocks previously stored in the storage media locally residing on the second server node.

6. The method of claim 1, wherein performing the storage synchronization operation by the first server node further comprises the first server node sending a message together with the copy of the modified data block to the second server node, wherein the message indicates which copies of one or more other modified data blocks previously stored in the storage media locally residing on the second server node can be invalidated and overwritten.

7. The method of claim 1, wherein performing the storage synchronization operation by the first server node further comprises:
   determining, by the first server node, an available storage capacity of the storage media locally residing on the second server node; and
   causing one or more modified data blocks in the write-back cache to be sent to the second server node synchronously with storing all modified data blocks in the write-back cache to corresponding locations in the protected data block storage system;
   wherein the one or more modified data blocks sent to the second server node do not exceed the determined available storage capacity of the storage media locally residing on the second server node.

8. The method of claim 1, wherein the first and second server nodes implement a peer-to-peer server cluster system, and wherein the protected data block storage system comprises at least one of a cluster of DAS (direct attached storage) devices, a SAN (storage area network) comprising a cluster of storage media devices, and a virtual SAN comprising a cluster of storage media devices.

9. The method of claim 1, wherein said storage media locally residing on the second server node comprises system memory of the second server node.

10. An article of manufacture comprising a processor-readable storage medium having stored therein program code of one or more software programs, wherein the program code is executable by one or more processors to execute a process comprising:

accessing, by a first server node, a data block from a protected data block storage system in response to a request for the data block from an application executing on the first server node;

writing, by the first server node, a modified data block to a write-back cache that is implemented in system memory residing on the first server node, wherein the modified data block comprises a modified version of the accessed data block which is generated by the application modifying the accessed data block;

protecting the modified data block for write-back to the protected data block storage system by the first server node performing a storage synchronization operation in response to a storage synchronization request by the application, wherein the storage synchronization operation comprises:

the first server node sending a copy of the modified data block in the write-back cache to a second server node to temporarily store the copy of the modified data block in storage media locally residing on the second server node, wherein said storage media is separate from the protected data block storage system;

the first server node informing the application that the storage synchronization operation is deemed complete at least with respect to the modified data block in the write-back cache, in response to the copy of the modified data block being stored in said storage media locally residing on the second server node; and the first server node marking the modified data block in the write-back cache as being protected, in response to the synchronization operation being deemed complete; and initiating, by the first server node, an asynchronous write-back operation to store a copy of the modified data block in the write-back cache, which is marked as being protected, in the protected data block storage system.

11. The article of manufacture of claim 10, wherein the copy of the modified data block is sent from the first server node to the second server node over a dedicated communication link between the first and second server nodes, which is separate from a communications network used by the first and second server nodes for peer-to-peer communication.

12. The article of manufacture of claim 10, further comprising program code which is executable by the one or more processors to execute a process comprising:

marking, by the first server node, the modified data block in the write-back cache as unmodified, after the copy of the modified data block is stored in the protected data block storage system; and causing, by the first server node, the copy of the modified data block in said storage media locally residing on the second server node to be invalidated.

13. The article of manufacture of claim 10, wherein the program code to perform the storage synchronization operation by the first server node further comprises program code that is executable by the one or more processors to execute a process comprising:

utilizing, by the first server node, a remote direct memory access protocol for remotely controlling the storage media locally residing on the second server node;

wherein remotely controlling the storage media comprises:

writing the copy of the modified data block in the storage media locally residing on the second server node; and invalidating copies of one or more other modified data blocks previously stored in the storage media locally residing on the second server node.

14. The article of manufacture of claim 10, wherein the program code to perform the storage synchronization operation by the first server node further comprises program code that is executable by the one or more processors to execute a process comprising:

the first server node sending a message together with the copy of the modified data block to the second server node, wherein the message indicates which copies of one or more other modified data blocks previously stored in the storage media locally residing on the second server node can be invalidated and overwritten.

15. The article of manufacture of claim 10, wherein said storage media locally residing on the second server node comprises system memory of the second server node.

16. A computing system, comprising:

first server node comprising system memory residing on the first server node, wherein the first server node comprises a write-back cache implemented in the system memory; and a protected data block storage system coupled to the first server node;

wherein the first server node is configured to execute a process comprising:

accessing a data block from a protected data block storage system in response to a request for the data block from an application executing on the first server node;

writing a modified data block to the write-back cache that is implemented in the system memory residing on the first server node, wherein the modified data block comprises a modified version of the accessed data block which is generated by the application modifying the accessed data block;

protecting the modified data block for write-back to the protected data block storage system by performing a storage synchronization operation in response to a storage synchronization request by the application, wherein the storage synchronization operation comprises:

sending a copy of the modified data block in the write-back cache to a second server node of the computing system to temporarily store the copy of the modified data block in storage media locally residing on the second server node, wherein said storage media is separate from the protected data block storage system;

informing the application that the storage synchronization operation is deemed complete at least with respect to the modified data block in the write-back cache, in response to the copy of the modified data block being stored in said storage media locally residing on the second server node; and marking the modified data block in the write-back cache as being protected, in response to the synchronization operation being deemed complete; and initiating an asynchronous write-back operation to store a copy of the modified data block in the write-back cache, which is marked as being protected, in the protected data block storage system.

17. The system of claim 16, wherein the copy of the modified data block is sent from the first server node to the second server node over a dedicated communication link between the first and second server nodes, which is separate from a communications network used by the first and second server nodes for peer-to-peer communication.

18. The system of claim 16, wherein the first server node is further configured to execute a process comprising:
  marking the modified data block in the write-back cache as unmodified, after the copy of the modified data block is stored in the protected data block storage system; and
  causing the copy of the modified data block in said storage media locally residing on the second server node to be invalidated.

19. The system of claim 16, wherein in performing the storage synchronization operation, the first server node is further configured to execute a process comprising:
  utilizing a remote direct memory access protocol for remotely controlling the storage media locally residing on the second server node;
  wherein remotely controlling the storage media comprises:
    writing the copy of the modified data block in the storage media locally residing on the second server node; and
    invalidating copies of one or more other modified data blocks previously stored in the storage media locally residing on the second server node.

20. The computing system of claim 16, wherein said storage media locally residing on the second server node comprises system memory of the second server node.

* * * * *